United States Patent [19]

Miele et al.

[11] 3,928,472

[45] Dec. 23, 1975

[54] PROCESS FOR THE PRODUCTION OF INDANOL-(4) AND INDANOL-(5)

[75] Inventors: Heinrich Miele, Weinheim, Bergstr; Winfried Orth, Hassloch, Pfalz; Emmerich Pastorek, Mannheim, all of Germany

[73] Assignee: Rutgerswerke Aktiengesellschaft, Frankfurt am Main, Germany

[22] Filed: Feb. 14, 1973

[21] Appl. No.: 332,476

[30] Foreign Application Priority Data

Feb. 22, 1972 Germany.......................... 2208253

[52] U.S. Cl. ............................. 260/628; 260/619 F
[51] Int. Cl.² ........................................ C07C 37/04
[58] Field of Search ....................... 260/628, 619 F

[56] References Cited
UNITED STATES PATENTS

| | | | |
|---|---|---|---|
| 2,754,285 | 7/1956 | Petropoulos........................ | 260/47 |
| 3,767,713 | 10/1973 | Theimer.......................... | 260/617 F |

FOREIGN PATENTS OR APPLICATIONS

| | | | |
|---|---|---|---|
| 8,720 | 7/1960 | Japan.................................. | 260/628 |

*Primary Examiner*—James O. Thomas, Jr.
*Assistant Examiner*—W. B. Lone
*Attorney, Agent, or Firm*—Browne, Beveridge, DeGrandi & Kline

[57] ABSTRACT

A process for the production of indanol-(4) or indanol-(5), said process comprising adding an alkali metal salt, alkaline earth metal salt or ammonium salt of indan-4- or indan-5-sulfonic acid to potassium hydroxide and at least one alkali metal salt of a second acid selected from the group consisting of aliphatic monocarboxylic acids, aliphatic polycarboxylic acids, hydroxysubstituted aliphatic monocarboxylic or polycarboxylic acids and alkoxy substituted aliphatic monocarboxylic or polycarboxylic acids while heating and agitating the resulting mixture at a temperature of about 250°–300°C. Indanol-(4) and indanol-(5) are useful in preparing fungicides, insecticides and bactericides.

9 Claims, No Drawings

PROCESS FOR THE PRODUCTION OF INDANOL-(4) AND INDANOL-(5)

This invention relates to a process for the production of indanol-(4) and indanol-(5) from an alkali melt of the corresponding indan sulfonates. The process of this invention is economical and easy to carry out.

It is known in the art that indanol-(4) and indanol-(5) can be prepared by melting alkali metal salts of indan sulfonic acids with potassium hydroxide. [Chem. Ber. 33, 737, 2895 (1900); 34, 1257 (1901); J. Am. Chem. Soc. 63,1317 ]However, only variable yields are generally attainable. An attempt has been made to improve yields by the addition of zinc dust to the melt [Chem. Ber. 57, 658 (1924); V. Am. Chem. Soc. 946 (1934) )]. It is also known that indanol-(4) can be synthesized from 4-nitro indan, but only at a low yield such as 20%. [Chem. Ber. 61, 1459 (1928); J. Am. Chem. Soc. 63, 1317; Coll. Czech. Comm. 28, 1877 (1963)].

It was found that prior art processes based on reaction in a melt were characterized by very substantial inhomogenieties in the melt. As a consequence, the melts were further characterized by a non-uniform temperature distribution. This resulted in low and highly fluctuating yields.

Thus, there exists a need in the art for a process for preparing indanol-(4) or indanol-(5) at reproducibly high yields. Additionally, the process should be easy to carry out.

Accordingly, this invention provides a process for preparing indanol-(4) or indanol-(5) from a melt of reactants. The process comprises adding an alkali metal salt, alkaline earth metal salt or ammonium salt of indan-4 - or indan-5-sulfonic acid to potassium hydroxide and at least one alkali metal salt of a second acid. The second acid is selected from the group consisting of aliphatic monocarboxylic acids, aliphatic polycarboxylic acids, hydroxy-substituted aliphatic monocarboxylic or polycarboxylic acids and alkoxy-substituted aliphatic monocarboxylic or polycarboxylic acids. There results a reaction mixture which is agitated while the indanol is being added. The reaction mixture is heated at a temperature of about 250°–300°C, preferable about 270°–290°C, until the reaction goes to completion.

Surprisingly, it has been found that employing the alkali metal salts of the second acid in the melt results in a melt having a particularly low viscosity, and therefore, a more uniform temperature distribution than prior processes. This makes it possible to maintain optimum temperature conditions in the reaction mixture, resulting in high yields, such as about 80–87%, with extraordinarily good reproducibility even on an industrial scale. The low viscosity of the melt makes it possible to decant the melt from the reaction vessel much as a liquid can be decanted from a container. This characteristic is particularly advantageous in industrial applications as will be readily apparent to persons skilled in the art.

The relative proportions of reactants can be determined with a minimum of experimentation. Generally, the molar ratios of the sulfonic acid salt to potassium hydroxide to the salt of the second acid are about 1 : 3–25 : 0.1–2. Preferably, the ratios are about 1 : 6–10 : 0.5–1.

Any of the alkali metal, alkaline earth metal and ammonium salts of the indan-(4)- and indan-(5)-sulfonic acids can be used in practicing this invention. These salts can be prepared by means known in the art. The preferred salts are the potassium, sodium, and ammonium sulfonates.

A salt of one or more of the aforementioned second acids is also employed in practicing this invention. In principle, the alkali metal salt of any acid falling within the foregoing group of second acids can be utilized. Preferred acid salts can be determined by a minimum of experimentation. Persons skilled in the art will also weigh the practical considerations, such as cost and availability. Generally speaking, the acid portion of the salt will contain up to about 6 carbon atoms, although other acids can be used. The salts of acetic acid (acetates) are particularly preferred.

When the salt of the second acid is hydroxy - or alkoxy-substituted, the number and location of these substituents are generally of secondary importance, and are generally dictated by the chain length and structure of the aliphatic acid. When the acid salt is alkoxy-substituted, the number of carbon atoms in the alkoxy group is not critical. As a practical matter, however, acid salts having $C_1$–$C_4$ alkoxy groups are most commonly found.

Sodium and potassium salts of the second acid are preferred. Preferred as the second acid are acetic acid, propionic acid, butyric acid, glycolic acid, methoxyacetic acid, malic acid, tartaric acid and citric acid.

Since the reaction is generally exothermic, the sulfonate is preferably added to a mixture containing the potassium hydroxide and the salt of the second acid. Addition of the sulfonate is accompanied by agitation of the reaction mass.

Other reaction conditions, such as time, pressure, condition of the atmosphere, solvents, method of isolation, etc., are not critical and will be apparent to those skilled in the art of synthesizing organic compounds.

Indanol-(4) and indanol-(5) are useful in the preparation of compounds exhibiting insecticide, batericide and fungicide activity.

This invention will be more clearly understood by reference to the following examples in which all parts, proportions, percentages and ratios are by weight unless otherwise indicated.

EXAMPLE 1 — Preparation of indanol-(5)

To a mixture containing 7.0 kg potassium hydroxide, 150 ml water and 0.5 kg potassium acetate are added 2.36 kg potassium indan-(5)-sulfonate. The sulfonate is added evenly over a period of 90 minutes while stirring the mixture at a temperature of 275°–280°C. After all the sulfonate has been added, the resulting melt is stirred for another 4 hours. The hot melt is decanted while still in liquid form. The melt is cooled and dissolved in 25 l of water. Concentrated hydrochloric acid is then added as a neutralizer until a pH of about 5–6 is obtained. The raw product, which at first is obtained in the form of an oil, solidifies to form a granular material with continued stirring while cooling to ambient temperature (20°C.). The product is removed, washed and distilled in a vacuum. Pure indanol-(5) distills over at 16 torr as a colorless liquid at a yield of 85–87.5% of theoretical, which melts at 54°–55°C. after solidifying.

EXAMPLEs 2–13—Preparation of indanol-(4) and indanol-(5)

Process conditions and yields for Examples 2–13 are set forth in the following table. These examples are conducted in a manner similar to Example 1.

Examples 2-13 for the production of indanol-4 and indanol-5

| No. | KOH kg | KOH mole | H₂O in ml | Additive in kg | salt of the indan sulfonic acid kg | mole | indan isomer | cation | yield in g | in % |
|---|---|---|---|---|---|---|---|---|---|---|
| 2 | 5 | 89.2 | 150 | 0.75 potassium acetate | 2.36 | 10 | 4 | K | 1078[1] | 80.4 |
| 3 | 5 | 89.2 | 150 | 0.75 potassium acetate | 2.66 | 5 | 4 | Ba | 1072[1] | 80.0 |
| 4 | 4.2 | 74.8 | 150 | 0.75 potassium acetate | 2.15 | 10 | 5 | NH₄ | 1135 | 84.6 |
| 5 | 5 | 89.2 | 150 | 0.66 potassium isobutyrate | 2.15 | 10 | 5 | NH₄ | 1072 | 80.0 |
| 6 | 5 | 89.2 | 150 | 0.75 potassium propionate | 2.15 | 10 | 5 | NH₄ | 1070 | 79.8 |
| 7 | 5 | 89.2 | 150 | 0.66 citric acid | 2.15 | 10 | 5 | NH₄ | 1045 | 78.0 |
| 8 | 3.5[2] | 62.4 | 150 | 0.75 potassium acetate | 2.2 | 10 | 5 | Na | 1075 | 80.2 |
| 9 | 4 | 71.3 | 120 | 0.60 potassium acetate | 2.09 | 5 | 5 | Mg | 1078 | 80.4 |
| 10 | 5 | 89.2 | 150 | 0.75 potassium acetate | 2.27 | 5 | 5 | Ca | 1135 | 84.6 |
| 11 | 5 | 89.2 | 150 | 0.75 sodium acetate | 2.36 | 10 | 5 | K | 1135 | 84.6 |
| 12 | 5.6 | 99.9 | 168 | 0.84 potassium glycolate | 2.2 | 10 | 5 | Na | 1101 | 82.0 |
| 13 | 6 | 107 | 180 | 0.90 sodium methoxy acetate | 2.36 | 10 | 5 | K | 1087 | 81.0 |

[1] Kp = 127–135°C/16 torr, F = 47–48°C
[2] + 1.5 kg NaOH (37.5 mole)

What is claimed is:

1. A process for the production of indanol-(4) or indanol-(5), said process comprising adding an alkali metal salt, alkaline earth metal salt or ammonium salt of indan-4- or indan-5-sulfonic acid to potassium hydroxide and at least one alkali metal salt of a second acid selected from the group consisting of $C_1$–$C_6$ aliphatic monocarboxylic acids, $C_1$–$C_6$ aliphatic polycarboxylic acids, hydroxy-substituted $C_1$–$C_6$ aliphatic monocarboxylic or polycarboxylic acids and alkoxy substituted $C_1$–$C_6$ aliphatic monocarboxylic or polycarboxylic acids, said alkoxy group having 1–4 carbon atoms, while heating and agitating the resulting mixture at a temperature of about 250°–300°C to form a melt, stirring said melt for another four hours after all of said sulfonate has been added, and recovering said indanol-(4) or indanol-(5) from said melt, wherein said sulfonic acid salt, said potassium hydroxide and said salt of said second acid are in a molar ratio of about 1:3–25:0.1–2.

2. Process of claim 1 in which said temperature is about 270°–290°C.

3. Process of claim 1 in which said molar ratios are about 1:6–10:0.5–1.

4. Process of claim 1 in which the sulfonate contains as a cation sodium, potassium or an ammonium radical.

5. Process of claim 1 in which the second acid is acetic acid, propionic acid, butyric acid, isobutyric acid, glycolic acid, methoxyacetic acid, malic acid, tartaric acid or citric acid.

6. Process of claim 3 in which the salt of the second acid is a sodium or potassium salt of acetic acid.

7. Process of claim 3 in which said temperature is about 270°–290°C.

8. Process of claim 1 in which the salt of said second acid is sodium acetate or potassium acetate, and the salt of the sulfonic acid is a potassium, sodium or ammonium sulfonate.

9. Process of claim 7 in which the salt of said second acid is sodium acetate or potassium acetate, and the salt of the sulfonic acid is a potassium, sodium or ammonium sulfonate.

* * * * *